(12) United States Patent
Hearn (10) Patent No.: US 9,352,911 B2
(45) Date of Patent: May 31, 2016

(54) WEIGHING IDLER ROLLER FOR A BELT WEIGHING APPLICATION

(71) Applicant: Michael John Hearn, County Kildare (IE)

(72) Inventor: Michael John Hearn, County Kildare (IE)

( * ) Notice: Subject to any disclaimer, the term of this patent is extended or adjusted under 35 U.S.C. 154(b) by 0 days.

(21) Appl. No.: 14/374,707

(22) PCT Filed: Jan. 28, 2013

(86) PCT No.: PCT/EP2013/051590
§ 371 (c)(1),
(2) Date: Jul. 25, 2014

(87) PCT Pub. No.: WO2013/110813
PCT Pub. Date: Aug. 1, 2013

(65) Prior Publication Data
US 2014/0353127 A1 Dec. 4, 2014

(30) Foreign Application Priority Data

Jan. 26, 2012 (GB) .................. 1201326.4

(51) Int. Cl.
*B65G 43/00* (2006.01)
*G01G 11/00* (2006.01)
*G01L 5/00* (2006.01)
*B65G 39/02* (2006.01)
*G01G 23/00* (2006.01)

(52) U.S. Cl.
CPC ................ *B65G 43/00* (2013.01); *B65G 39/02* (2013.01); *G01G 11/003* (2013.01); *G01L 5/0019* (2013.01); *G01G 23/002* (2013.01); *G01G 23/007* (2013.01)

(58) Field of Classification Search
CPC ........ B65G 39/00; B65G 39/02; B65G 43/00; B65G 2203/0258; G01G 11/003; G01G 11/04; G01G 23/007; G01G 23/002; G01L 5/0019; Y10S 198/959
See application file for complete search history.

(56) References Cited

U.S. PATENT DOCUMENTS 3,603,416 A * 9/1971 Spurlin ................. B65G 39/04
177/1
4,784,004 A * 11/1988 Ekola ...................... G01L 5/108
73/862.474

(Continued)

FOREIGN PATENT DOCUMENTS

DE 10060582 A1 6/2002
GB 2128345 A 4/1984

(Continued)

*Primary Examiner* — Gene Crawford
*Assistant Examiner* — Keith R Campbell
(74) *Attorney, Agent, or Firm* — Valauskas Corder LLC (57) ABSTRACT

An idler roller (1) for a belt conveyor and an idler roller assembly (41). The idler roller (1) comprises an elongate static shaft (3), a rotatable drum (5) mounted about and substantially surrounding the static shaft (3) and at least one bearing (7, 9) intermediate the shaft (3) and the rotatable drum (5). The idler roller (1) further comprises a load cell mounted on the static shaft internal the rotatable drum (5). The static shaft comprises a load cell section that is weakened relative to the remainder of the shaft.

16 Claims, 11 Drawing Sheets

(56) References Cited

U.S. PATENT DOCUMENTS

| | | | | |
|---|---|---|---|---|
| 5,591,921 | A * | 1/1997 | Schaede | B41F 33/00 73/849 |
| 5,670,752 | A * | 9/1997 | Nakajima | G01G 11/003 177/119 |
| 6,349,819 | B1 * | 2/2002 | Nohl | B65G 39/12 198/830 |
| 7,698,963 | B2 * | 4/2010 | Herhaus | G01L 1/2243 177/211 |
| 7,919,962 | B2 * | 4/2011 | Masham | G01R 33/10 324/261 |
| 7,997,153 | B2 * | 8/2011 | Gebhart | F27B 7/20 73/1.75 |
| 2008/0115590 | A1 * | 5/2008 | Loenner | G01L 5/045 73/862.42 |
| 2011/0155539 | A1 * | 6/2011 | Schmidt | B65G 13/06 198/608 |

FOREIGN PATENT DOCUMENTS

| | | |
|---|---|---|
| KR | 10-2012-0001135 A | 1/2012 |
| WO | 2007098465 A2 | 8/2007 |

* cited by examiner

WEIGHING IDLER ROLLER FOR A BELT WEIGHING APPLICATION

TECHNICAL FIELD

This invention relates to an idler roller for a belt conveyor.

BACKGROUND ART

Belt conveyors are commonly used to handle materials in many diverse fields ranging from mining and quarrying to food and feed production. The belt conveyors are typically used to transport materials from a first holding area such as a material handling vehicle's scoop or bucket, a hopper or a silo to a second holding area such as a mixing tank, a packaging area, a vehicle loading area or indeed to a different hopper or silo.

Frequently, the materials passing over the belt conveyor must be weighed. This enables the amount of material delivered to the second holding area to be carefully monitored which facilitates stock control. In some cases, accurately weighing the materials passing over a belt conveyor will facilitate the delivery of specified quantities of materials into a mixing vessel, for example, the amount of sand and aggregate delivered to a concrete mixing/delivery truck.

Belt conveyors typically comprise an endless belt led over a driven roller at one end of the belt conveyor and a following roller at the other end of the belt conveyor spaced apart from the driven roller. A plurality of idler rollers are provided intermediate the driven roller and the following roller to support the conveyor belt and the materials thereon and to limit the sag of the belt between the driven roller and the following roller. Generally speaking, the longer the span and/or the heavier the materials being supplied on the belt, the more idler rollers that are provided.

In order to weigh the materials passing over the belt conveyor, it is preferable to weigh the materials on the belt at a location spaced apart from either end of the belt conveyor. In other words, it is preferable not to take the weight measurement at or adjacent to either the driven roller or the following roller due to the sudden changes in loads often experienced at these locations. Therefore, it is generally accepted practice to measure the weight of materials passing over a belt conveyor at a point between the driven roller and the following roller. This ensures more consistent weighing of the materials.

In order to weigh the materials in this manner, it is common practice to disconnect an entire idler roller assembly from the frame of the conveyor, mount a sub frame having load cells thereon onto the conveyor frame and thereafter support the entire idler roller assembly on the load cells supported by the sub frame. One such system that has proven to be useful is that sold by Belt-Way Scales Inc., of Rock Falls, Ill., USA. Other commonly known belt scales are those described in detail in PCT Patent Publication No. WO2007/098465 in the name of New Enterprise, US Patent Publication No. US2007/074560 in the name of Dietrich, and UK Patent Publication No. GB2128345 in the name of Mitchell Cotts.

Although many of the known solutions for weighing materials on a belt conveyor are highly efficient, there are however some problems with the known solutions. First of all, the known systems are relatively time consuming to install. Typically, the idler roller assembly must be removed from the conveyor frame, holes must then be drilled into the conveyor belt frame, the sub-frame is then mounted on the belt conveyor frame before finally the idler roller assembly is mounted on the sub frame. Once in position, the next adjacent pair of idler rollers, one either side of the weighing idler roller, and in some cases two idler rollers either side of the weighing idler roller, must be shimmed so that the three (or in some cases five) idler rollers are substantially in line with each other to ensure accurate measurement. This is time consuming to perform during which time the conveyor belt will be out of operation perhaps resulting in lost revenue. Another problem with the known solutions is that by and large, the components and in particular the load cells are susceptible to damage caused by materials falling from the belt and accuracy of measurement may be diminished by build-up of materials on the load cells.

It is an object therefore of the present invention to overcome at least some of the problems with the known solutions.

SUMMARY OF INVENTION

According to the invention there is provided an idler roller for a belt conveyor, the idler roller comprising an elongate static shaft, a rotatable drum mounted about and substantially surrounding the static shaft and at least one bearing intermediate the shaft and the rotatable drum, the idler roller further comprising a load cell mounted on the static shaft internal the rotatable drum.

By having such an idler roller, the installation of the weighing idler roller will be significantly simplified. Instead of removing an entire idler roller assembly and mounting the idler roller assembly onto a sub frame with load cells, the existing idler roller (or the centre roller if the idler roller assembly comprises a centre roller and a pair of side rollers) may be removed from the existing idler roller assembly and replaced by the idler roller according to the invention. The load cell mounted on the static shaft internal the rotatable drum will permit the weight of the materials on the conveyor belt above to be weighed with accuracy. No additional sub-frame is required and it is not necessary to drill into the conveyor belt frame. Furthermore, as the load cell is located internal the idler roller, this will protect the load cell from damage caused by materials falling from the conveyor belt and there will not be a tendency for a degradation in performance caused by material build up on or around the load cell.

In one embodiment of the invention there is provided an idler roller in which the static shaft comprises a load cell section for the load cell, the load cell section having a weakened structure relative the remainder of the static shaft to promote bending of the shaft at the load cell section under load.

In one embodiment of the invention there is provided an idler roller in which the load cell section has a hollow internal bore. This is seen as a particularly simple way of providing a weakened section and furthermore this configuration will allow for the convenient placement of load cells in the hollow internal bore.

In one embodiment of the invention there is provided an idler roller in which the static shaft comprises a bearing carrier section upon which the bearing is mounted and in which the bearing carrier section is connected directly to the load cell section. By having the bearing carrier section connected directly to the load cell section, the forces from the rotating drum that act directly on the bearing carrier section will be transferred onto the load cell section for simpler load calculation.

In one embodiment of the invention there is provided an idler roller in which there are provided a pair of load cells mounted on the static shaft spaced apart from each other along the length of the static shaft.

In one embodiment of the invention there is provided an idler roller in which there is provided a load cell adjacent to each end of the elongate static shaft.

In one embodiment of the invention, there is provided a pair of load cell sections spaced apart from each other along the length of the static shaft, each load cell section having a weakened structure relative the remainder of the static shaft to promote bending of the shaft at the load cell sections under load.

In one embodiment of the invention, there is provided a load cell section adjacent each end of the elongate static shaft.

In one embodiment of the invention there is provided an idler roller in which the bearing is a self-aligning bearing. The self-aligning bearing ensures that the load applied to the load cells remains uncontaminated by any minor bending or misalignment which would cause unwanted dynamic loads being applied to the load cells.

In one embodiment of the invention there is provided an idler roller in which there is provided a battery and a battery charger circuit mounted internal the rotatable drum, the battery charger circuit comprising at least one magnet mounted on the interior surface of the rotatable drum and a pickup coil mounted on the static shaft coincident with the magnet. By having such an embodiment, as the drum rotates, the changing magnetic field will cause a voltage difference across the coil and a current will flow in the coil. This current can be used to charge the battery thereby providing a self-sufficient apparatus.

In one embodiment of the invention there is provided an idler roller in which there is provided a plurality of magnets circumferentially spaced about the interior surface of the rotatable drum to provide a more stable voltage.

In one embodiment of the invention there is provided an idler roller in which the rotatable drum is provided with an internal cylindrical sleeve constructed from a plastics material and in which the magnet is mounted on the internal sleeve. This is seen as a simple way of constructing the device to ensure accurate placement of the magnets. It is envisaged that the plastic sleeve will be approximately 5 mm thick with areas machined out of the outside surface but not penetrating the sleeve. These machined sections can be used to locate the magnets while maintaining a smooth inner surface. A secondary function of the plastic sleeve will be to eliminate condensation within the unit which may happen with a metal interior.

In one embodiment of the invention there is provided an idler roller in which there is provided a conveyor speed sensor mounted internal the drum, the conveyor speed sensor comprising a detector mounted on the static shaft and a target mounted on the interior surface of the rotatable drum.

In one embodiment of the invention there is provided an idler roller in which the target comprises a magnet mounted on the interior surface of the rotatable drum. In one embodiment, the target magnet will be one of the magnets of the battery charger circuit.

In one embodiment of the invention there is provided an inclinometer mounted on the static shaft internal to the rotatable drum.

In one embodiment of the invention there is provided an idler roller in which there is provided a processor mounted internal the rotatable drum, the processor being in communication with one or more of the load cell, the conveyor speed sensor and the inclinometer. By having such a configuration, the idler roller can act as a stand alone unit to calculate the weight of materials passing over the conveyor and a weight measurement may be transmitted from the idler roller according to the invention and sent to a remote monitoring unit. All of the components may be housed internal the device and this will cut down the cabling requirements.

In one embodiment of the invention there is provided an idler roller in which there is provided a communications module internal the rotatable drum for communicating load data with a remote external controller module. Preferably the communications module will allow for wireless communications with the remote external controller module.

In one embodiment of the invention there is provided an idler roller assembly for a belt conveyor, the idler roller assembly comprising an assembly frame for mounting on a belt conveyor frame, a plurality of rollers mounted on the frame including a centre roller and a pair of wing rollers mounted either side of the centre roller, and in which the centre roller comprises the idler roller as claimed in any preceding claim.

In another embodiment of the invention there is provided an idler roller assembly for a belt conveyor in which one or both of the wing conveyors comprise the idler roller as claimed.

BRIEF DESCRIPTION OF THE DRAWINGS

The invention will now be more clearly understood from the following description of some embodiments thereof given by way of example only with reference to the accompanying drawings, in which.

DETAILED DESCRIPTION OF THE DRAWINGS

Figure 1:
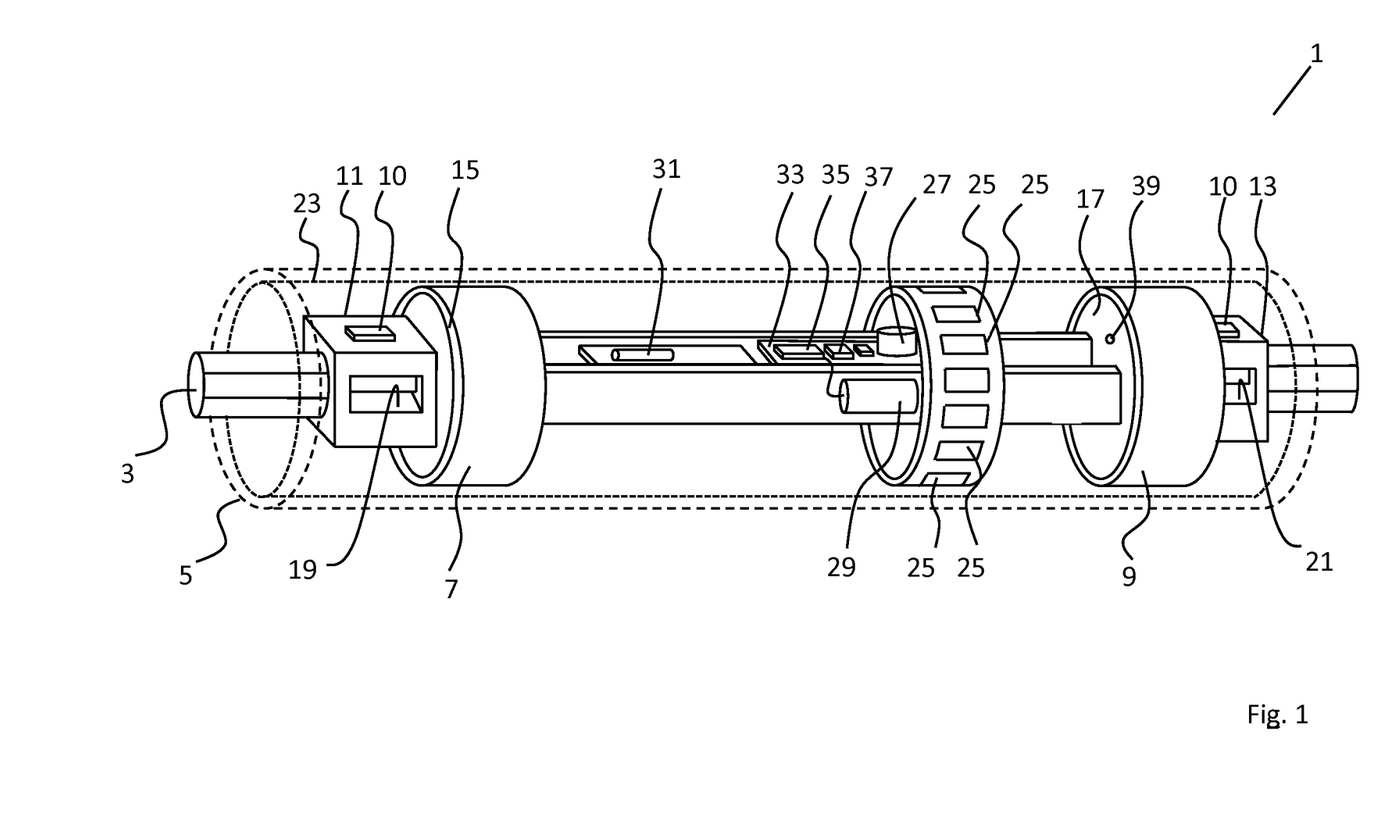
FIG. 1 is a perspective, diagrammatic view with some parts shown in outline of an idler roller according to the invention.

Referring to FIG. 1, there is shown an idler roller according to the invention, indicated generally by the reference numeral 1, comprising a static shaft 3, a rotatable drum 5 (shown in dashed outline) substantially surrounding the static shaft and a pair of bearings 7, 9 intermediate the shaft and the rotatable drum. The static shaft 3 comprises a pair of load cell sections 11, 13 having load cells thereon 10 and a pair of bearing carrier sections 15, 17 connected directly to the load cell sections 11, 13 respectively. The load cell sections are located adjacent the opposite ends of the static shaft and each comprises a hollowed out core 19, 21 that provides a weakened section in the static shaft 3 relative to the remainder of the static shaft.

The idler roller further comprises a plastic sleeve 23 (shown in dotted outline) mounted internal the rotatable drum and a plurality of magnets 25 mounted on the plastic sleeve spaced circumferentially around the sleeve. A magnetic field pick up coil 27 is mounted on the static shaft in a position coincident with the magnets 25. The magnets 25 and the magnetic field pick up coil 27 form part of a battery charger circuit to assist in powering electronics and communications equipment in the idler roller. A conveyor speed sensor in the form of a magnetic detector 29 is also mounted on the shaft 3 in a position capable of detecting the magnetic field of a magnet 25 as it passes the detector. Instead of a magnetic detector 29, a proximity sensor could be used instead. An inclinometer 31 mounted on the shaft internal the rotatable drum is also provided to measure the angle at which the conveyor belt is to the horizontal (in the direction of travel of the conveyor).

A circuit board 33 having a processor 35 and a wireless communications module 37 is provided on the static shaft. The processor is arranged to receive data from one or more of the load cells, the inclinometer and the conveyor speed sensor. By knowing these values, the processor can calculate the weight of material that is passing over the conveyor at a given moment in time. The communication module can then transmit the weight calculations to a remote external controller module or a remote monitoring unit (not shown). Finally, there is provided an aperture 39 in the bearing carrier section for throughpassage of wiring from the circuit board, such as an antenna cable, if necessary. End caps (not shown) will preferably be provided to seal the end of the rotatable drum about the static shaft to prevent ingress of dirt and moisture.

Figure 2:
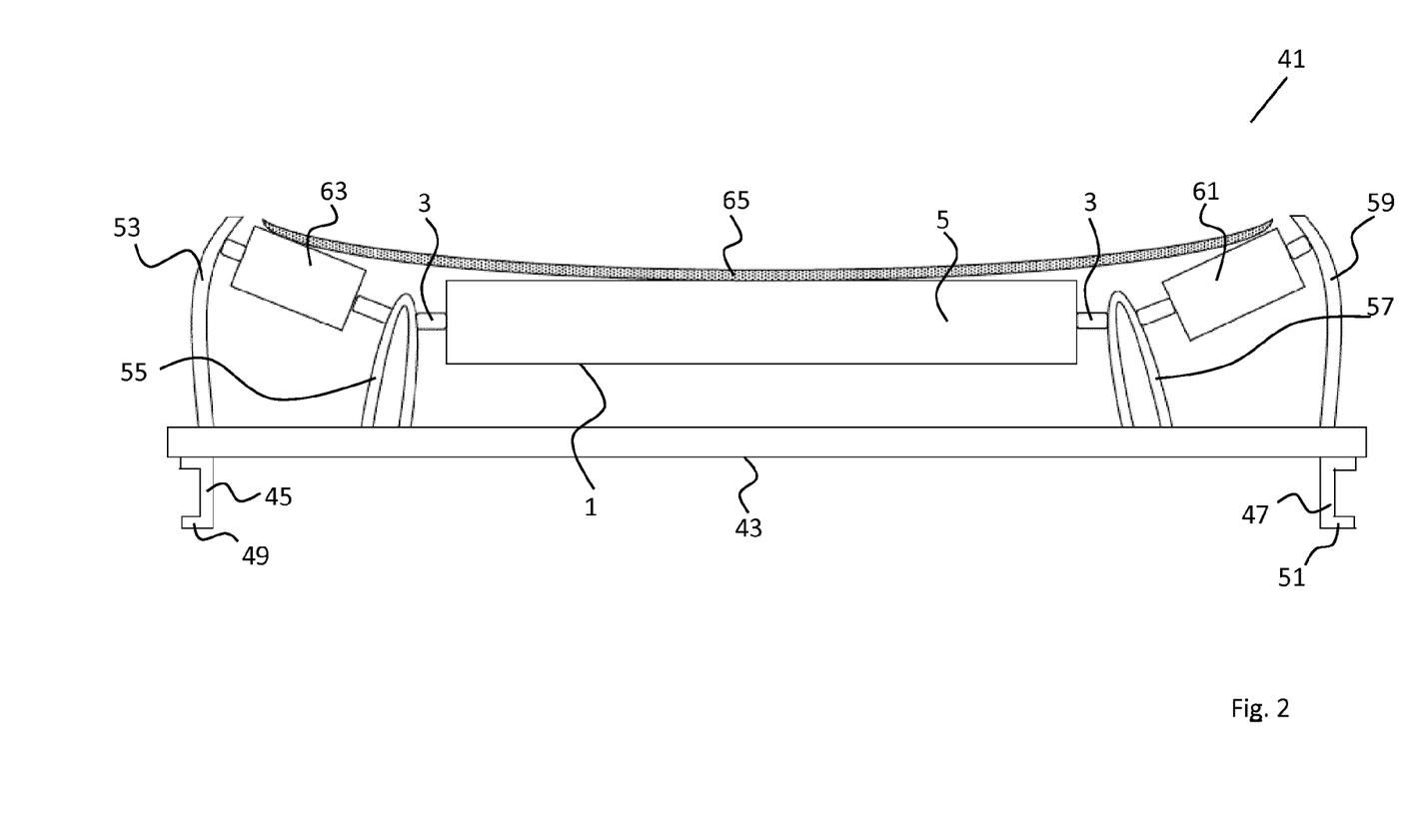
FIG. 2 is a front view of an idler roller assembly according to the invention.

Referring to FIG. 2 of the drawings, there is shown an idler roller assembly, indicated generally by the reference numeral 41, incorporating the idler roller 1 according to the invention. The idler roller assembly 41 comprises a frame 42 having a base 43, a pair of downwardly depending legs 45, 47 with feet 49, 51. The feet are drilled with holes (not shown) and bolts are passed through these holes in the feet 49, 51 into corresponding holes in the conveyor belt frame (not shown) and secured in position with nuts to hold the idler roller assembly 41 in position relative to the conveyor belt frame. The frame further comprises a plurality of upstanding arms 53, 55, 57, 59 on which there are mounted a plurality of rollers, a pair of wing rollers 61, 63 and a central roller provided by way of the idler roller 1. A conveyor belt 65 is shown resting on the rollers 1, 61, 63.

It can be seen from the foregoing that the construction of idler roller assembly 41 is identical to a standard idler roller assembly with the exception that the centre roller has been replaced with an idler roller having a different internal construction, namely with a load cell mounted therein (in the rotatable drum) for monitoring the weight of the materials passing overhead on the belt. In this way, the centre roller of a standard idler roller assembly can be switched out with an idler roller according to the present invention to provide an idler roller assembly that is capable of weighing the materials passing over the assembly. This will enable very fast installation of the weighing apparatus with the minimum of downtime of the belt and minimum amount of disruption caused to production.

Typically, in order to use a standard construction of idler roller assembly similar to that shown in FIG. 2 in the weighing of goods passing over the standard idler roller assembly, the entire idler roller assembly would have to be dismounted from a conveyor belt frame and mounted on a separate sub-frame. There would have to be provided dedicated load cells mounted on the sub-frame supporting the standard assembly. However, this is no longer necessary by implementing the new construction of idler roller according to the invention.

Figure 3:
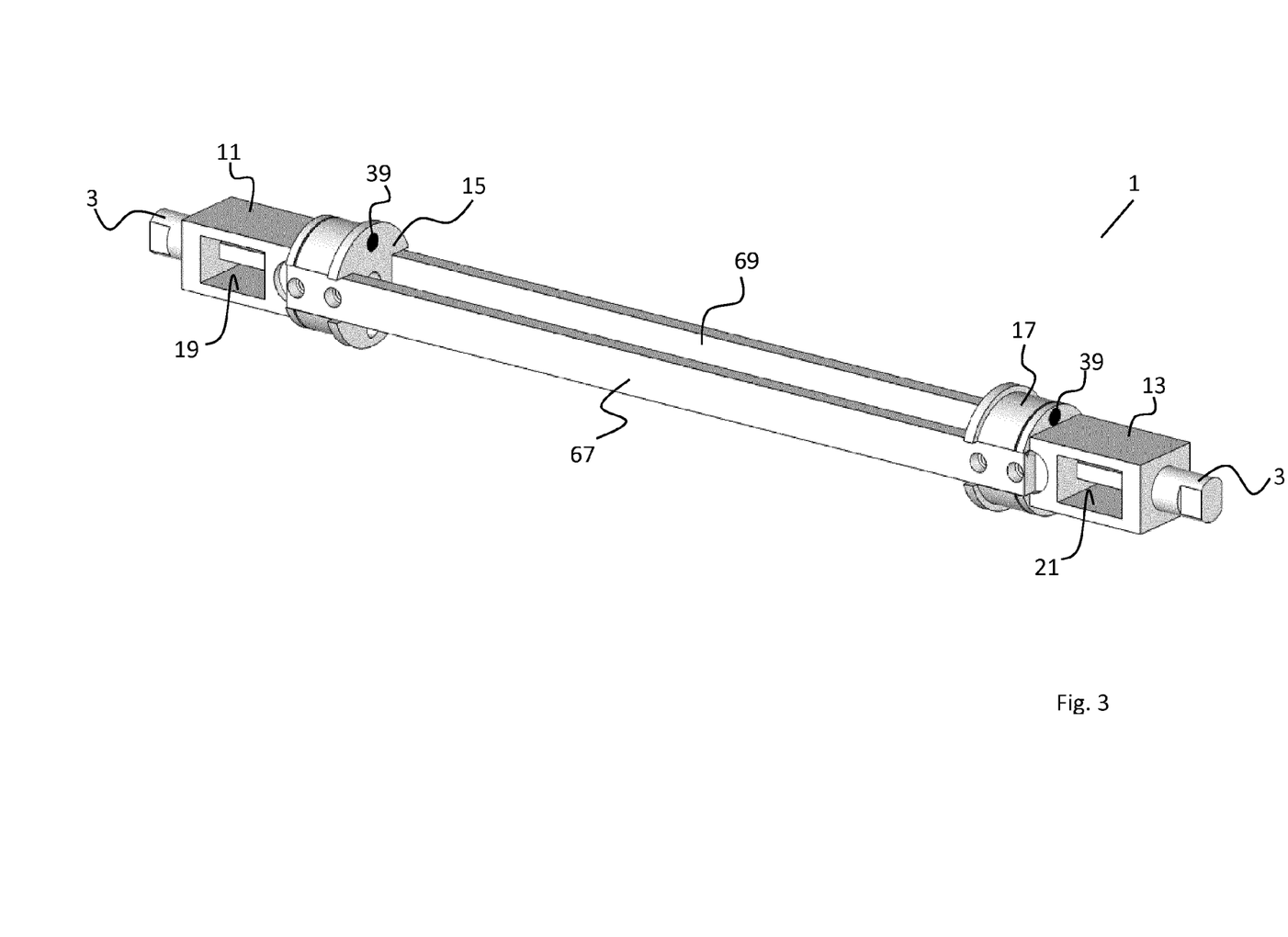
FIG. 3 is a perspective view of an idler roller according to the invention with the outer rotatable drum, electronics and bearings removed.

Referring to FIG. 3 there is shown a perspective view of an idler roller according to the invention with the outer rotatable drum, electronics and bearings removed, where like parts have been given the same reference numeral as before. The idler roller comprises a pair of elongate bars, 67, 69 each of which is connected at one end to the bearing carrier section 15 and to the bearing carrier section 17 at the other end. The electronics (not shown) are mounted between the pair of elongate bars. The length of the elongate bars may be chosen selectively to suit the particular sized roller therefore allowing for streamlined manufacturing techniques to be employed.

Figure 4:
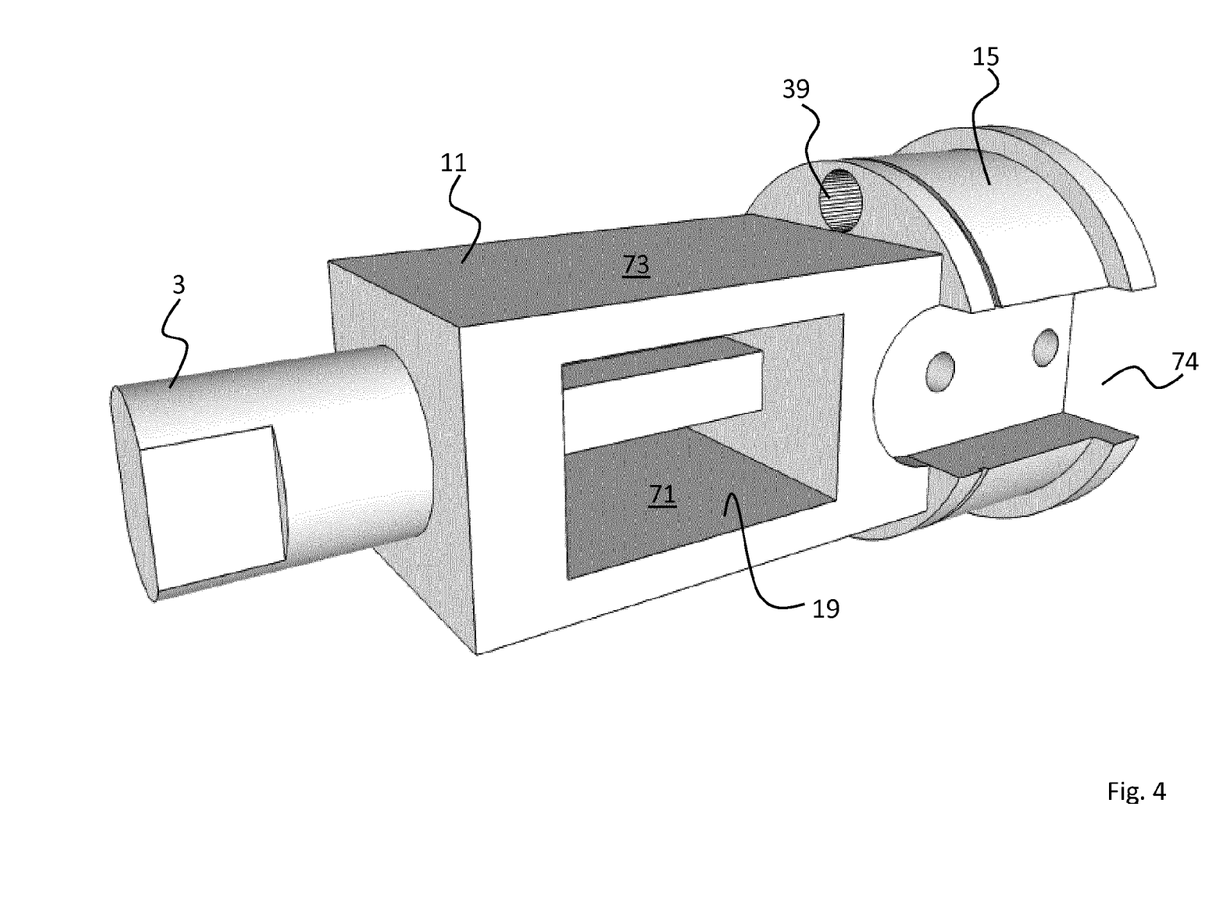
FIG. 4 is a perspective view of part of the static shaft, load cell and bearing carrier section of the idler roller according to the invention.

Referring to FIG. 4, there is shown a perspective view of part of the static shaft, load cell and bearing carrier section of the idler roller shown in FIG. 3. The static shaft 3, load cell 11 and bearing carrier section 15 are formed from a unitary piece of metal and may be cast as a single piece or milled and cut into shape from a single piece if desired. The load cell 11 has a plurality of surfaces, two of which 71, 73 are shown, on which strain gauges may be mounted. The bearing carrier section 15 has a pair of channels, 74, 78, only one of which, 74, is shown formed therein for reception of an elongate bar (not shown). The other of the pair of channels 78 is formed on the opposite side of the bearing carrier section 15.

Figure 5:
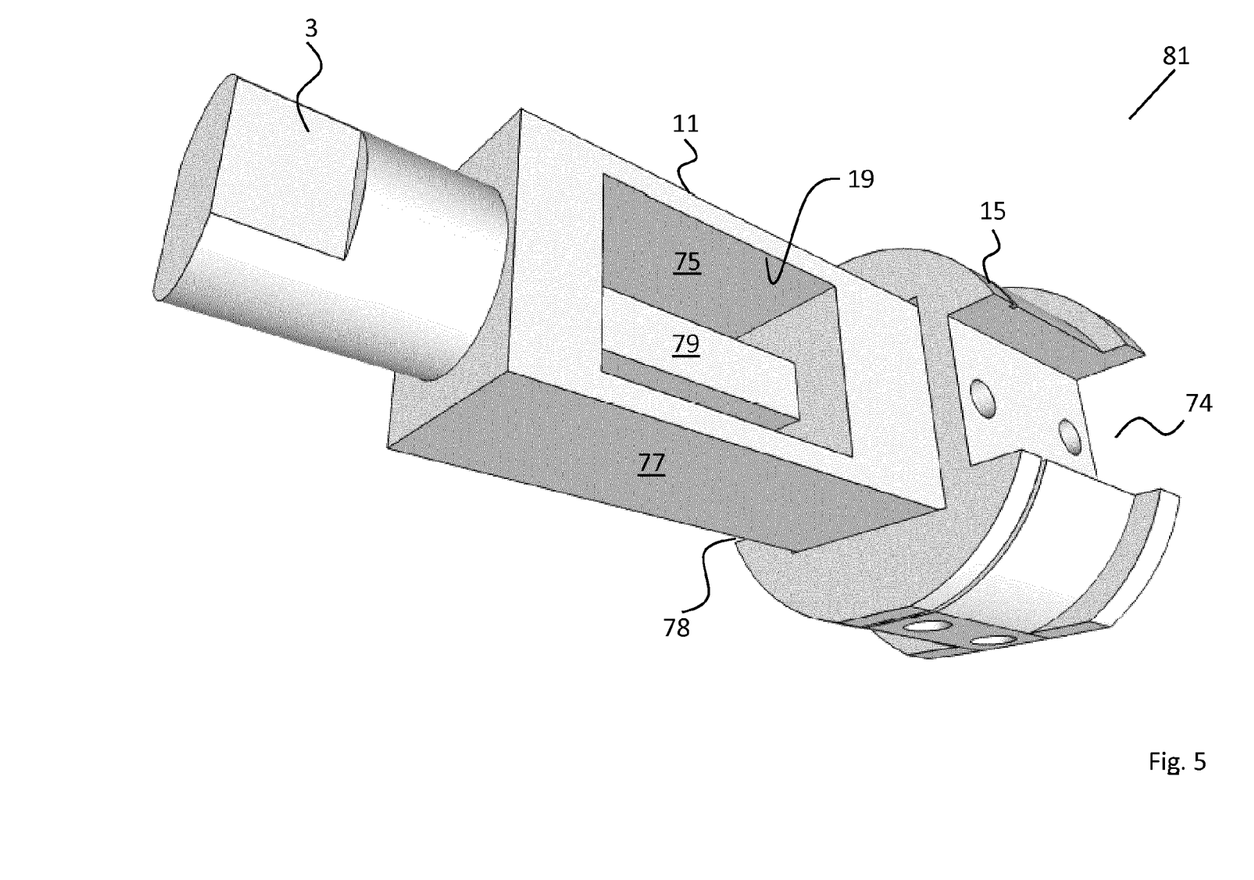
FIG. 5 is a perspective view of an alternative construction of static shaft, load cell and bearing carrier section for use in the idler roller according to the invention.

Referring to FIG. 5, there is shown a perspective view of an alternative construction of static shaft, load cell and bearing carrier section, indicated generally by the reference numeral 81, for use in the idler roller according to the invention, where like parts have been given the same reference numeral as before. The load cell 11 has a further pair of surfaces 75, 77 upon which the strain gauges (not shown) may be mounted. It is envisaged that one strain gauge may be mounted on one or more surfaces 71, 73, 75, 77 or indeed multiple strain gauges may be mounted on one or more surfaces 71, 73, 75, 77. Alternatively, one or more strain gauges may be mounted on the central bar 79 in addition to or instead of one or more strain gauges being mounted on one or more of the surfaces 71, 73, 75, 77. The strain gauges may be mounted elsewhere on the load cell if desired, depending on the deflection that it is desired to measure. The bearing carrier section 15 comprises a second channel 78 for reception of an elongate bar (not shown).

The apparatus shown in FIG. 5 differs from that shown in FIG. 4 predominantly in that the apparatus of FIG. 4 is formed from a unitary piece whereas in the apparatus shown in FIG. 5, the load cell 11 and the bearing carrier section 15 are two separate components connected together. The bearing carrier section 15 of FIG. 5 comprises a central bore (more clearly illustrated in FIG. 6) for reception of the end of the load cell 11. If desired, the static shaft 3 could be formed integrally with or separately from the load cell 11.

Figure 6:
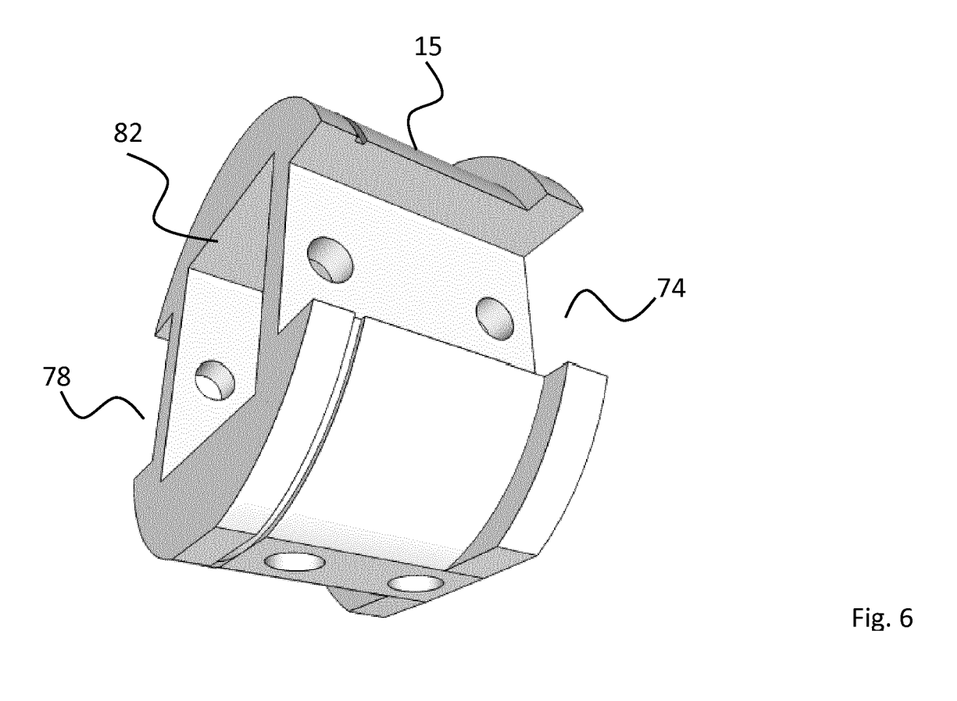
FIG. 6 is a perspective view of the bearing carrier section of FIG. 5 for incorporation of an off-the-shelf load cell instead of a custom load cell.

Referring to FIG. 6, there is shown a perspective view of the bearing carrier section of FIG. 5. The bearing carrier section 15 comprises a central bore 82 for reception of the end of a load cell therein. The load cell may be secured in position using one or more nuts and bolts.

In use, materials travelling on the continuous belt will pass over the idler roller. As the materials pass over the idler roller, the static shaft will bend under the weight of those materials. In those instances where load cell sections with weakened sections are provided, the static shaft will bend more predictably at the load cell sections. The degree to which the static shaft bends is determined by the weight of the materials travelling on the belt above the idler roller. If a strain gauge is used, the strain gauge will detect the amount of deflection or bending of the static shaft and the load cells can determine the weight of the materials travelling on the belt above the idler roller.

Referring to FIGS. 7 to 15 inclusive there is shown an alternative embodiment of idler roller according to the invention, indicated generally by the reference numeral 101, in which in FIGS. 8 to 15 inclusive, various parts of the idler roller are removed sequentially to illustrate the manner of construction of the idler roller.

Figure 7:
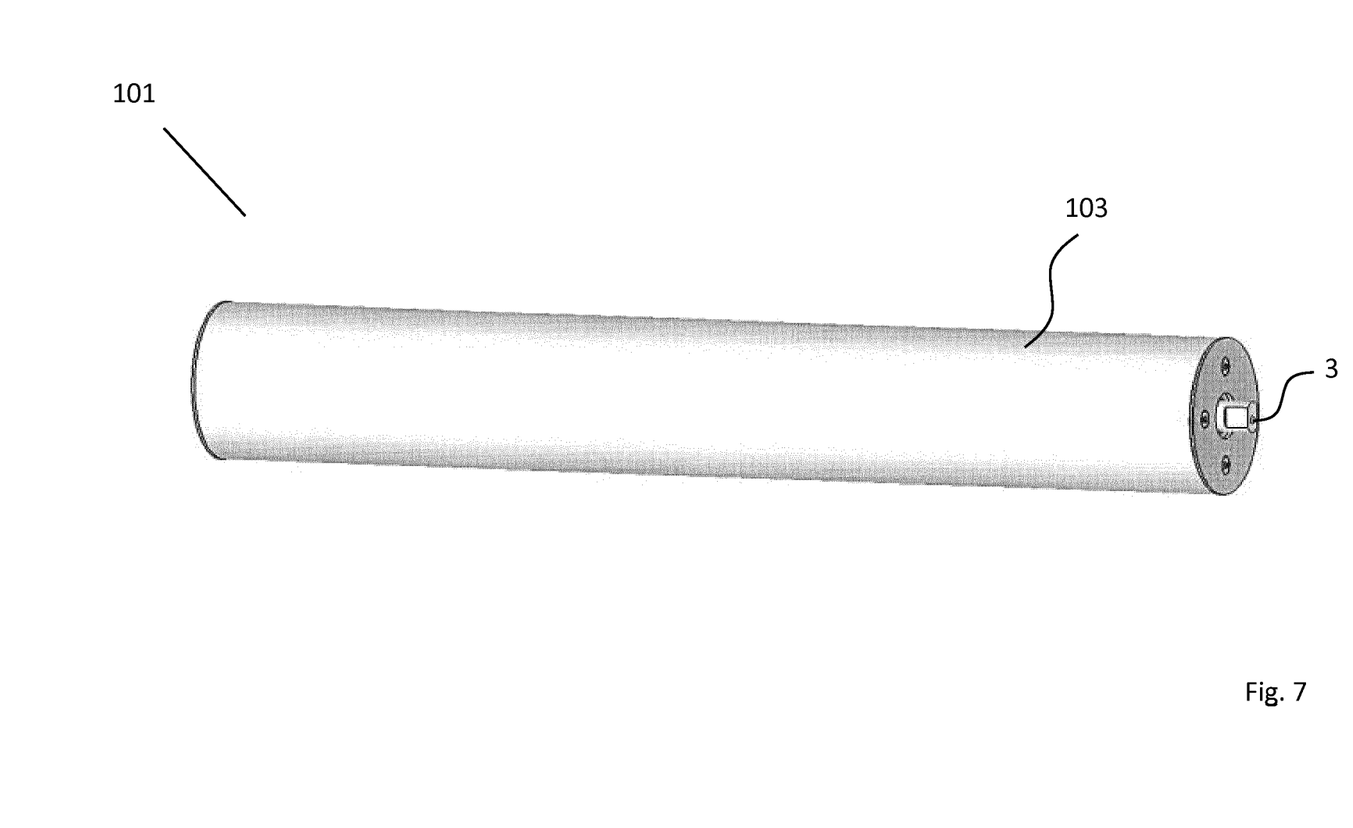
FIG. 7 is a perspective view of an alternative embodiment of idler roller according to the invention.
Figure 8:
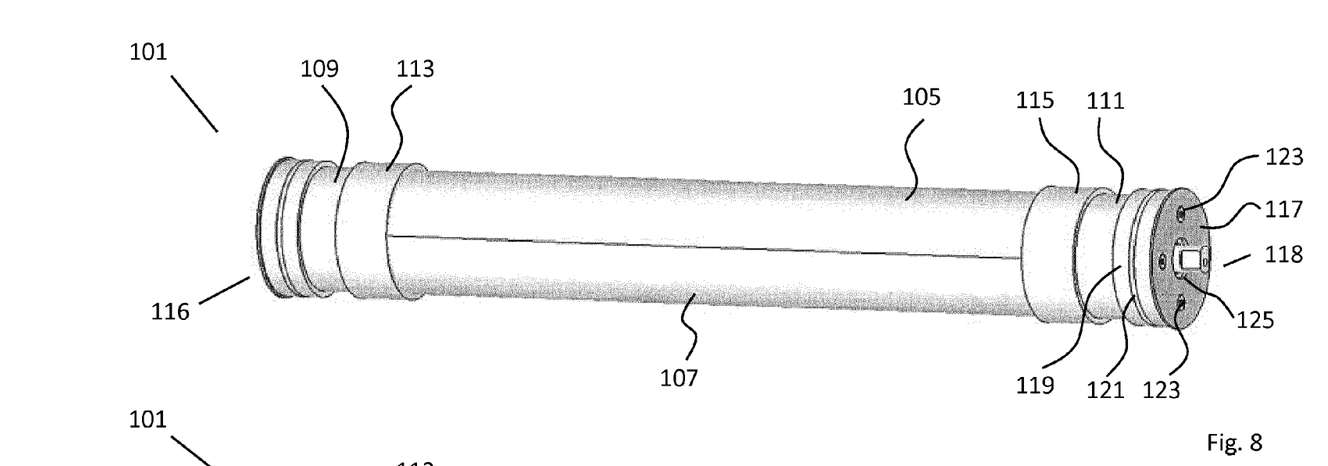
FIGS. 8 to 15 are perspective views of the idler roller illustrated in FIG. 7 with parts thereof having been removed sequentially to illustrate the construction of the idler roller.

Referring initially to FIG. 7, there is shown a perspective view of the alternative construction of idler roller including a static shaft 3 and a rotatable drum, also referred to as an outer pipe cover 103. In FIG. 8, the outer pipe cover 103 has been removed exposing a pair of inner half pipes 105, 107, a pair of inner spacer pipes 109, 111 and a pair of bearing holders 113, 115. In addition to the above components, the construction of a pair of end caps 116, 118 can be seen in more detail. Each end cap comprises an outer end plate 117, an inner end plate 119, an O-Ring seal 121 between the inner end plate 119 and the outer end plate 117, a plurality of end plate bolts 123 to secure the end plate in position and an end plate shaft seal 125 surrounding the static shaft 3.

Figure 9:
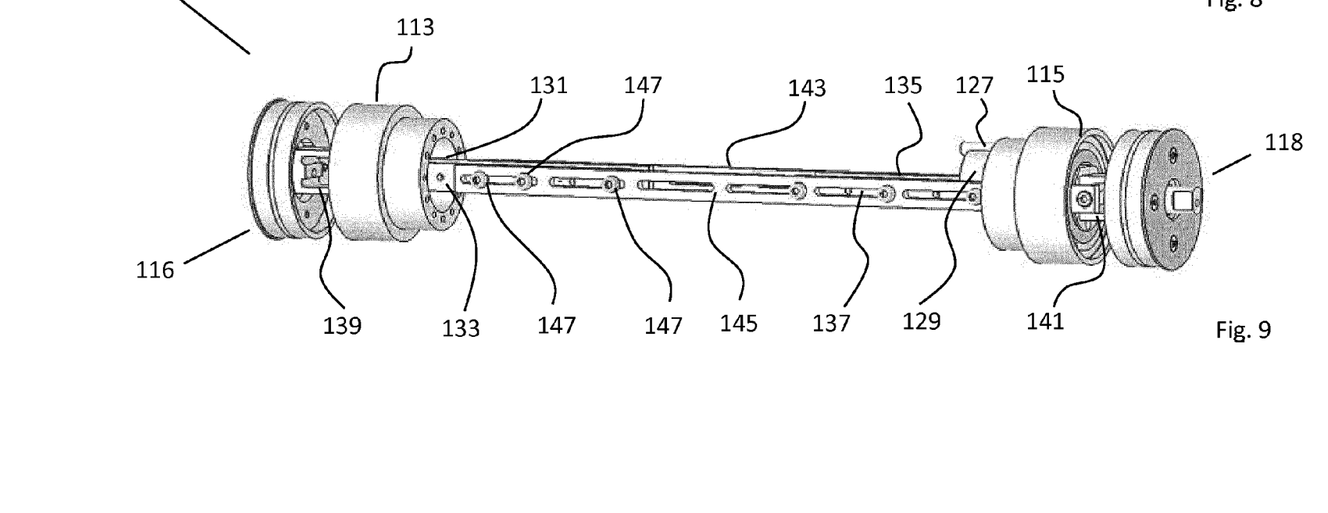

In FIG. 9, the inner half pipes 105, 107 and the inner spacer pipes 109, 111 have been removed, exposing a speed sensor 127, a speed sensor bracket 129, a plurality of load cell links 131, 133, 135, 137, two of which (131, 133) are connected to a first load cell 139 and the other two of which (135, 137) are connected to a second load cell 141. There is further shown a pair of slotted links 143, 145 for coupling each of the load cell links 131, 133 connected to one of the load cells 139 to another load cell link 135, 137 that is connected to the other load cell 141, and a plurality of fixing members 147, in this case, nuts, bolts and washers for connecting the load cell links 131, 133, 135, 137 to the slotted links 143, 145.

Figure 10:
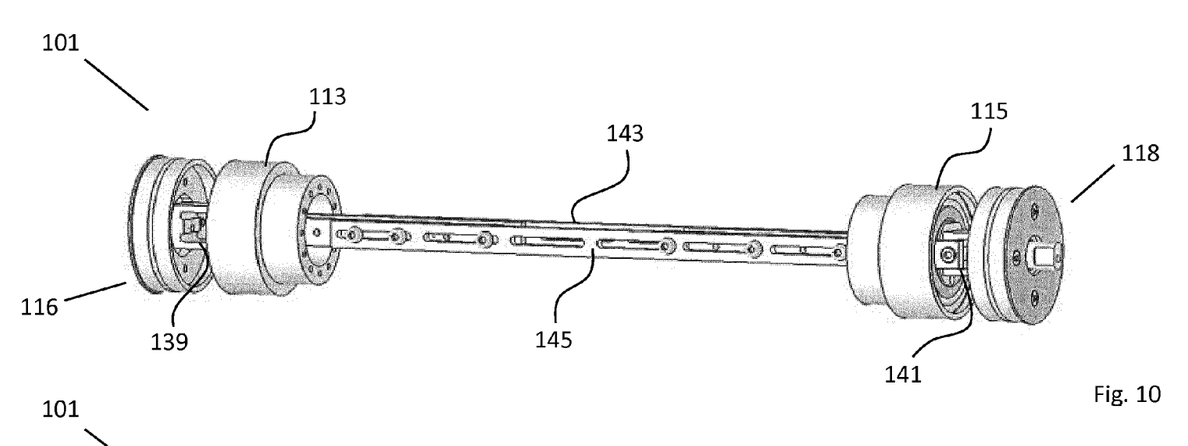
Figure 11:
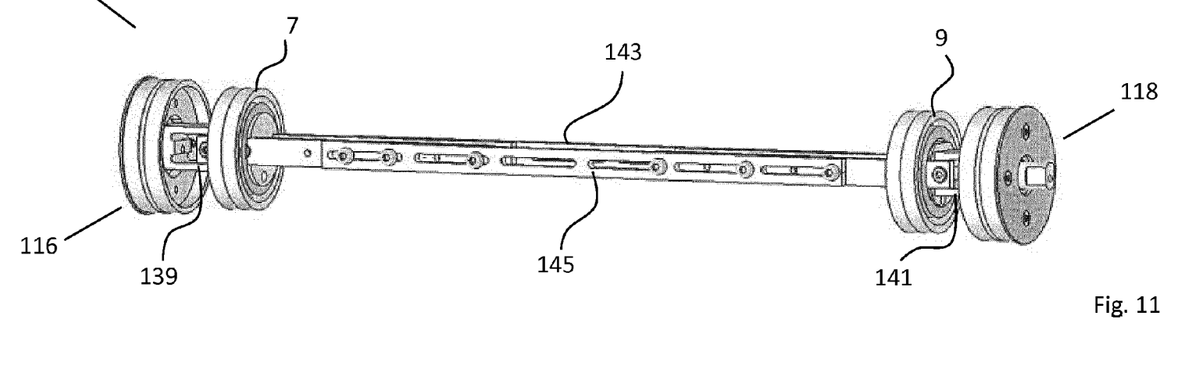
Figure 12:
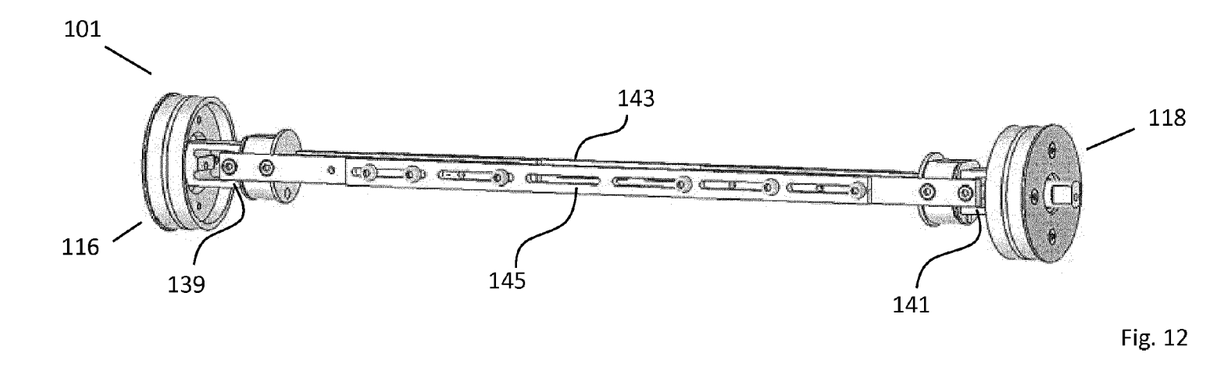
Figure 13:
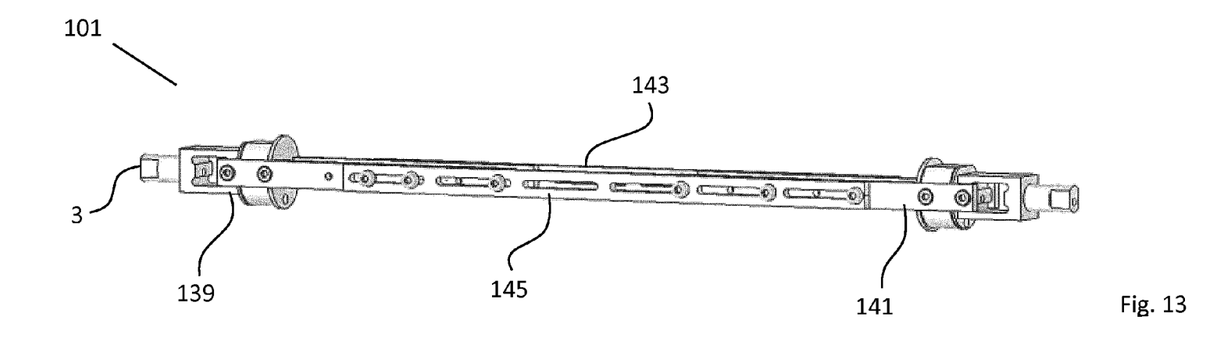
Figure 14:
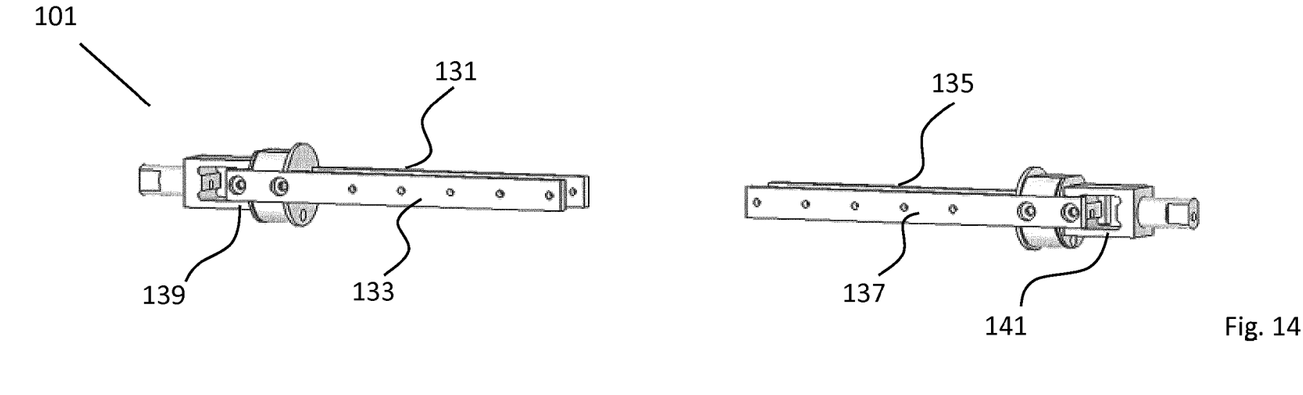
Figure 15:
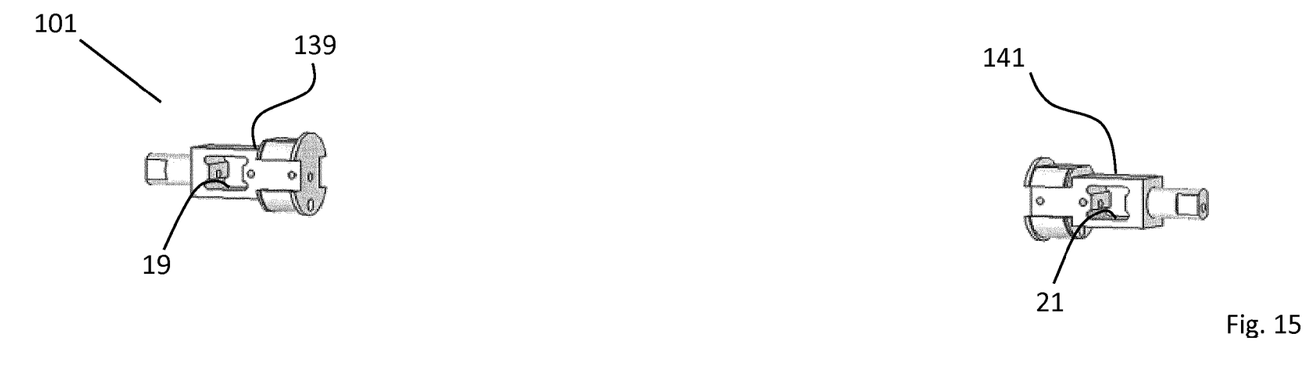

Referring to FIG. 10, the speed sensor 127 and the speed sensor bracket 129 have been removed. Referring to FIG. 11, the bearing holders 113, 115 have been removed exposing a pair of bearings 7, 9. Referring to FIG. 12, the bearings 7, 9 have been removed exposing the majority of the load cells 139, 141 on which the bearings 7, 9 were mounted. Referring to FIG. 13, the outer end plates 117, the inner end plates 119, the O-Ring seal 121 between the inner end plate 119 and the outer end plate 117, the end plate bolts 123 and the end plate shaft seals 125 have been removed. In this Figure, the load cells 139 and 141 can be seen in more detail. Referring now to FIG. 14, the slotted links 143, 145 and the fixing member 147 have been removed. Finally, in FIG. 15, the plurality of load cell links 131, 133, 135, 137 have been removed leaving only the load cells 139 and 141. The construction of the load cells 139, 141 differs from the construction of the load cells sections 11, 13 in that that are a unitary piece and there is no elongate strut formed in the hollow inner core 19, 21.

It will be understood from the foregoing that various modifications could be made to the embodiments shown without departing from the scope of the present invention. For example, more or less load cells could be provided on the static shaft. Ideally there are two however this will depend in part on the length of the shaft and the weight of the materials passing over the weighing idler roller. Furthermore, instead of providing a bore, various other ways could be employed to weaken the load cell section relative to the remaining static shaft such as by providing one or more cuts in the static shaft in that area, by using a different material for the shaft in that area or by narrowing the shaft in that area, for example. Other ways of weakening the shaft at the load cell section are also envisaged and the above list is not exhaustive.

In the embodiment shown in FIG. 2, the idler roller assembly has one idler roller according to the invention that replaces the standard centre roller. It is envisaged that in order to ensure accurate measurement of the weight of material passing overhead on the conveyor, it may be necessary to factor in the weight of material supported by the wing rollers 61, 63. This may require initial calibration of the device and a number of trials to see how much, if by anything, the weight measurements are out due to weight of material acting on the wing rollers rather than the centre idler roller with the load cells therein. This amount could then be factored into any subsequent measurements and calculations.

Furthermore, it is also possible to have idler rollers according to the invention replacing not only a centre roller of the trough conveyor shown in FIG. 2, but also provide idler rollers according to the invention to replace the wing rollers. In this way, all three idler rollers (centre and the two wings) could have the means to weigh the materials passing over the conveyor. It is envisaged that two of the idler rollers in such a configuration, for example, the wing idler rollers, may only have load cells and means to communicate the measured values to the processor of the third central idler roller and the processing will be carried out in the centre idler roller however this is a matter largely of choice and will be based in part on manufacturing cost considerations. In the embodiment shown, the load cells are preferably strain gauges however other load cells could be used if desired.

It is envisaged that it would be possible to use standard off-the-shelf load cells instead of custom made units by fabricating ends that will let the load cell locate in the position a standard roller once occupied. Furthermore, it is envisaged that digital load cells with in-built communications could be used so that the calculations could be carried out remotely, external to the roller, after the load cells had transmitted the measurements to a remote processing unit. This could be achieved without additional electronics and communications circuitry being provided inside the roller.

In the specification the terms "comprise, comprises, comprised and comprising" and the terms "include, includes, included and including" are all deemed totally interchangeable and should be afforded the widest possible interpretation.

The invention is in no way limited to the embodiment hereinbefore described but may be varied in both construction and detail within the scope of the appended claims.

The invention claimed is:

1. An idler roller for a belt conveyor, comprising an elongate static shaft, a rotatable drum mounted about and substantially surrounding the static shaft and at least one bearing intermediate the shaft and the rotatable drum, the idler roller further comprising a load cell mounted on the static shaft internal the rotatable drum, and in which there is provided a conveyor speed sensor mounted internal the drum, the conveyor speed sensor comprising a detector mounted on the static shaft and a target mounted on the interior surface of the rotatable drum.

2. The idler roller as claimed in claim 1 in which the static shaft comprises a load cell section for the load cell, the load cell section having a weakened structure relative the remainder of the static shaft to promote bending of the shaft at the load cell section under load.

3. The idler roller as claimed in claim 2 in which the load cell section defines a hollow internal bore.

4. The idler roller as claimed in claim 2 in which the static shaft comprises a bearing carrier section upon which the bearing is mounted and in which the bearing carrier section is connected directly to the load cell section.

5. The idler roller as claimed in claim 2 in which there are provided a pair of load cell sections in the static shaft spaced apart from each other along the length of the static shaft.

6. The idler roller as claimed in claim 2 in which there is provided a load cell section adjacent to each end of the elongate static shaft.

7. The idler roller as claimed in claim 1 in which there are provided a pair of load cells mounted on the static shaft spaced apart from each other along the length of the static shaft.

8. The idler roller as claimed in claim 7 in which there is provided a load cell adjacent to each end of the elongate static shaft.

9. The idler roller as claimed in claim 1 in which the bearing is a self-aligning bearing.

10. The idler roller as claimed in claim 1 in which there is provided a battery and a battery charger circuit mounted internal the rotatable drum, the battery charger circuit comprising at least one magnet mounted on the interior surface of the rotatable drum and a pickup coil mounted on the static shaft coincident with the magnet.

11. The idler roller as claimed in claim 9 in which there is provided a plurality of magnets circumferentially spaced about the interior surface of the rotatable drum.

12. The idler roller as claimed in claim 10 in which the rotatable drum is provided with an internal cylindrical sleeve constructed from a plastics material and in which the magnet is mounted on the internal sleeve.

13. The idler roller as claimed in claim 1 in which the target comprises a magnet mounted on the interior surface of the rotatable drum.

14. The idler roller as claimed in claim 1 in which there is provided an inclinometer mounted internal the rotatable drum.

15. The idler roller as claimed in claim 1 in which there is provided a processor mounted internal the rotatable drum, the processor being in communication with one or more of the load cell, a conveyor speed sensor and an inclinometer.

16. The idler roller as claimed in claim 1 in which there is provided a communications module internal the rotatable drum for communicating load data with a remote external controller module.

* * * * *